United States Patent [19]
Willis

[11] Patent Number: 5,630,689
[45] Date of Patent: May 20, 1997

[54] MEANS FOR LOADING AND TRANSPORTING BALES

[76] Inventor: Ronald K. Willis, R.R. #1, Box 25A, Davis City, Iowa 50065

[21] Appl. No.: 369,684

[22] Filed: Jan. 6, 1995

Related U.S. Application Data

[63] Continuation of Ser. No. 100,364, Aug. 2, 1993, abandoned, which is a continuation-in-part of Ser. No. 793,140, Nov. 18, 1991, Pat. No. 5,236,294.

[51] Int. Cl.$^6$ .................................................. A01D 90/02
[52] U.S. Cl. .......................... 414/111; 414/24.5; 414/502
[58] Field of Search ..................................... 414/24.5, 551, 414/459, 460, 461, 495, 540, 545, 911, 541, 544, 111, 502; 280/43.23, 790

[56] References Cited

U.S. PATENT DOCUMENTS

| | | |
|---|---|---|
| 3,398,984 | 8/1968 | Ajero . |
| 3,776,356 | 12/1973 | France . |
| 3,884,321 | 5/1975 | Drake et al. . |
| 3,957,165 | 5/1976 | Smith . |
| 4,042,140 | 8/1977 | McFarland . |
| 4,072,241 | 2/1978 | Parker et al. . |
| 4,076,137 | 2/1978 | Kucera . |
| 4,204,790 | 5/1980 | Baxter . |
| 4,248,561 | 2/1981 | Graves . |
| 4,390,312 | 6/1983 | Skeem . |
| 4,396,330 | 8/1983 | Rozenboom . |
| 4,396,331 | 8/1983 | Forster . |
| 4,459,075 | 7/1984 | Eichenberger ......................... 414/24.5 |
| 4,500,242 | 2/1985 | Beikman ............................... 414/24.5 |
| 4,537,548 | 8/1985 | Lockhart ............................... 414/459 X |
| 4,630,986 | 12/1986 | Taylor .................................. 414/24.5 X |
| 4,773,806 | 9/1988 | Beaulieu . |
| 4,938,646 | 7/1990 | Elias et al. . |
| 5,071,304 | 12/1991 | Godfrey ................................. 414/24.5 |
| 5,165,836 | 11/1991 | Shonka .................................. 414/111 |
| 5,236,294 | 8/1993 | Willis .................................... 414/24.5 |
| 5,340,259 | 8/1994 | Flaskey ................................. 414/24.5 |

FOREIGN PATENT DOCUMENTS

| | | | |
|---|---|---|---|
| 2026429 | 2/1980 | United Kingdom ................ 414/24.5 |
| 2199012 | 6/1988 | United Kingdom ................ 414/24.5 |

Primary Examiner—Karen B. Merritt
Assistant Examiner—Stephen Gordon
Attorney, Agent, or Firm—Zarley, McKee, Thomte, Voorhees, & Seas

[57] ABSTRACT

A bale transport comprising a carrier frame including a pair of elongated spaced beams and a pair of elongated rails secured to the beams and spaced inwardly therefrom in general parallel relation thereto. Wheels are secured to the carrier frame, and hydraulic cylinders connect the carrier frame and the wheels for raising and lowering the frame with respect to the ground surface. A loading frame is on the carrier frame and a power mechanism on the carrier frame rigidly extends the loading frame laterally with respect to the carrier frame in order to load a bale onto the elongated movable height adjustable carrier frame. In operation, the loading frame is slid laterally by the power mechanism to a laterally extended position with respect the carrier frame. The carrier frame is moved longitudinally so that the loading frame is on an engagable position with a bale to be loaded resting on a supporting surface. The carrier frame is lowered to substantially the same level as the surface supporting the bale. The loading frame is then retracted laterally towards the carrier to engage and move the bale onto said carrier frame without lifting. The carrier frame is then raised to an elevated position with respect to the supporting surface in order to carry the bale on the wheeled transport.

10 Claims, 4 Drawing Sheets

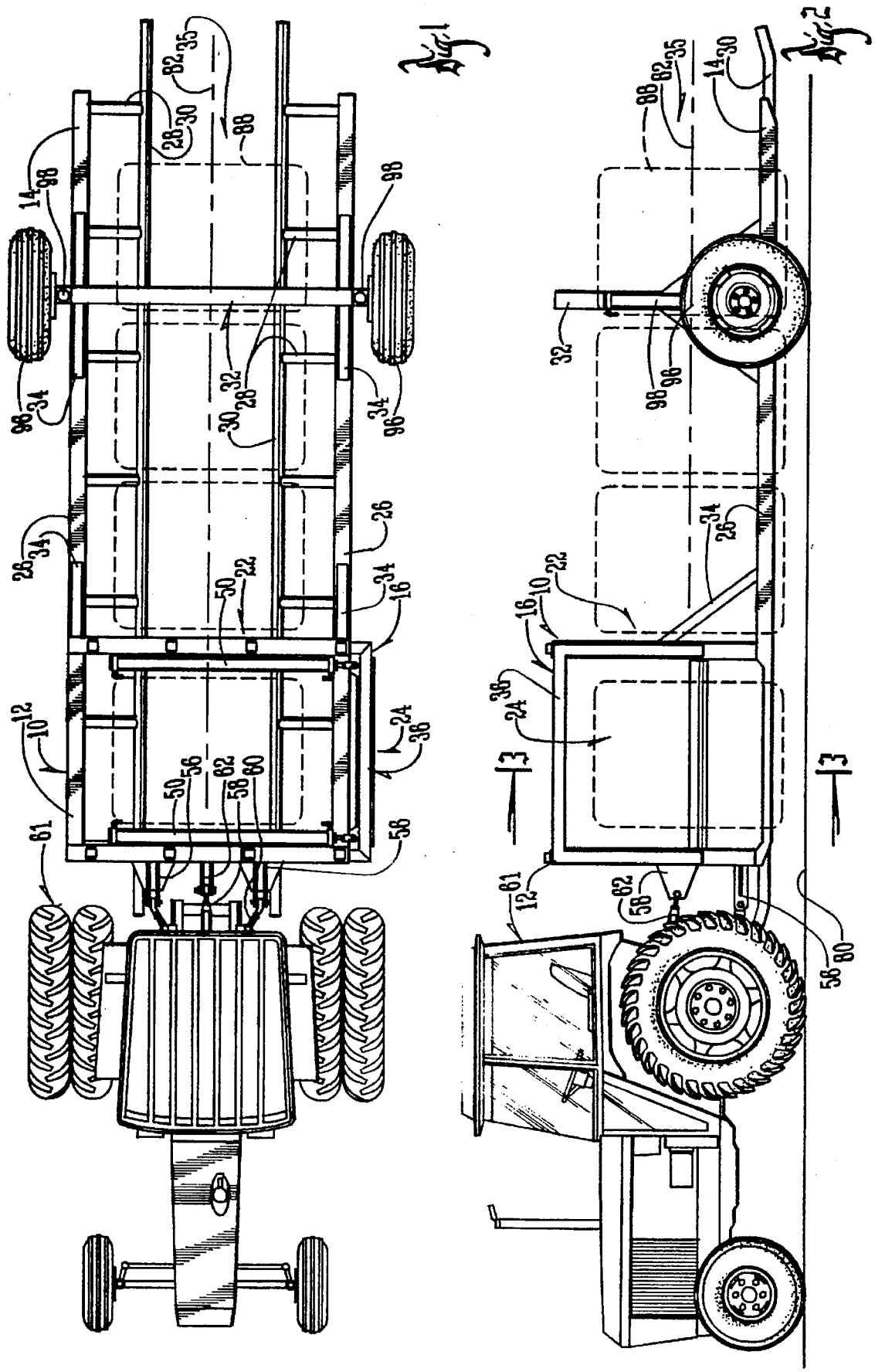

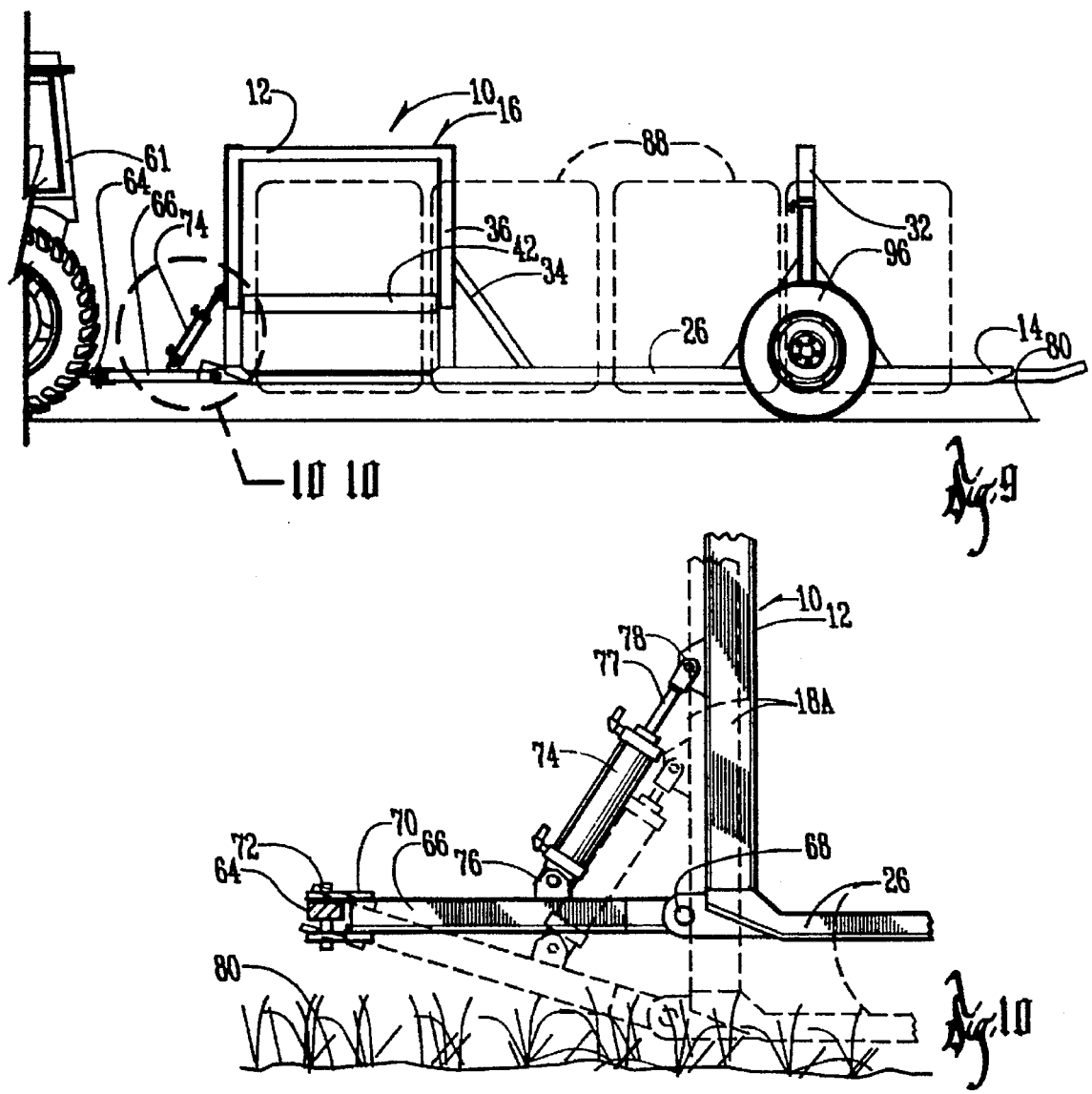

5,630,689

MEANS FOR LOADING AND TRANSPORTING BALES

This is a continuation of application Ser. No. 08/100,364 filed on Aug. 2, 1993 and now abandoned, which is a continuation-in-part of application Ser. No 07/793,140 filed Nov. 18, 1991 (now issued U.S. Pat. No. 5,236,294).

BACKGROUND OF THE INVENTION

Large round bales of hay weigh between 1500 and 3000 pounds, depending on the size of the baler used. After the bales are created, it is necessary to gather them from the hay fields and remove them to a storage area for subsequent feeding to livestock.

A plurality of hay transport trailers exist, but it is often difficult to load and unload the large round bales from these trailers. Existing trailers often have to be adjusted laterally to squeeze or otherwise grasp the bales, and commonly involve a plurality of moving parts.

It is therefore a principal object of this invention to provide a method and means for transporting bales wherein a large number of bales can be quickly picked up from the field, transported to a storage location, and quickly discharged from the bale transport mechanism.

A further object of this invention is to provide a method and means for transporting bales which substantially avoids the steps of adjusting the bale carrying mechanism to grasp the bales being transported.

A still further object of this invention is to provide a method and means for transporting bales which can be conveniently operated from a conventional farm tractor.

A still further object of this invention is to provide a method and means for transporting bales wherein the bales can be easily and efficiently picked up from the ground surface upon which they are resting and from a random location within a harvested hayfield.

These and other objects will be apparent to those skilled in the art.

BRIEF SUMMARY OF THE INVENTION

The hay bale transport of this invention comprises a carrier frame including a pair of elongated spaced beams and a pair of elongated rails secured to said beams and spaced inwardly therefrom in general parallel relation thereto. Wheels are secured to the carrier frame, and power means connect the carrier frame and the wheels for raising and lowering the frame with respect to the ground surface. A loading frame is on the carrier frame. A power mechanism is on the carrier frame for moving the loading frame laterally with respect to the carrier frame. The loading frame includes a roller for engaging a bale for movement thereof onto the carrier frame when the loading frame is moved from an extended lateral position towards the carrier frame. An elongated longitudinal alley space exists within the frame for receiving a plurality of bales to be transported.

The method of this invention involves moving the loading frame to a laterally extended position with respect to the carrier frame; moving the carrier frame longitudinally so that the loading frame is in an engagable position with a bale on the ground surface; lowering the carrier frame to a level substantially at the ground surface; moving the loading frame laterally towards the carrier to engage and move the bale onto the carrier frame, and raising the carrier and the bale to a transport position.

BRIEF DESCRIPTION OF THE DRAWINGS

FIG. 1 is a plan view of the device of this invention secured to a conventional farm tractor;

FIG. 2 is a side elevational view of the device of FIG. 1;

FIG. 9 is a side elevational view of a modified form of the invention; and

FIG. 10 is an enlarged scale side elevational view taken on line 10—10 of FIG. 9.

DESCRIPTION OF THE PREFERRED EMBODIMENT

The trailer frame or carrier 10 is best shown in FIGS. 1 and 2, and includes a front end 12 and a rearward end 14.

Figure 7:
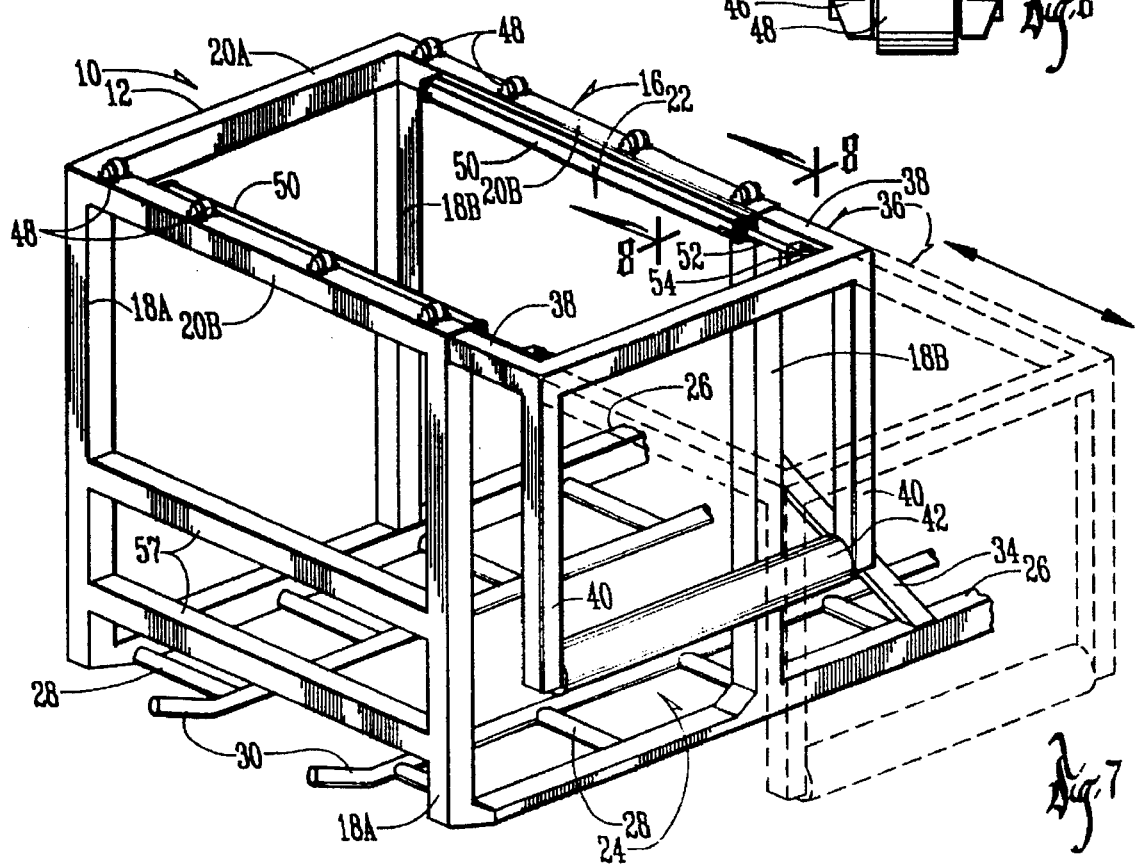
FIG. 7 is an enlarged scale sectional view of the forward end of the carrier frame showing the loading cage and the loading frame.

With reference primarily to FIG. 7, a loading cage 16 is located at the front end 12 of carrier frame 10 and includes forward vertical legs 18A and rearward vertical legs 18B. The upper ends of the legs 18A and 18B are interconnected by tubes 20A and 20B which are preferably square in cross section. Loading cage 16 has a rear opening 22 and a side opening 24 with both openings being large enough to receive a conventional round bale.

Carrier frame 10 includes two spaced apart elongated beams 26 which are secured to the lower ends of the vertical legs 18A and 18B as best shown in FIG. 7. A plurality of spaced arms 28 extend inwardly from beams 26 and support elongated rails 30 which are spaced from the beams 26 and extend generally parallel thereto.

As shown in FIGS. 1 and 2, an inverted U-shaped frame member 32 is secured to the rearward portions of beams 26. Diagonal braces 34 extend forwardly and rearwardly from frame member 32. An additional pair of diagonal braces 34 extend rearwardly from loading cage 16 to brace the loading cage to the beams 26 (FIGS. 1 and 2). An elongated alley 35 is thereby formed over beams 26 and extends through the rear opening 22 of the loading cage 16 and through the inverted U-shaped frame member 32.

A loading frame 36 (FIG. 7) has elongated parallel horizontal arms 38 which are slidably received within members 20B at the top of loading cage 16. Vertical arms 40 extend downwardly from the outer ends of arms 38. Additionally, the outer ends of arms 38 are secured by horizontal arm 41. A roller assembly 42 extends horizontally between the lower ends of arms 40.

Figure 8:
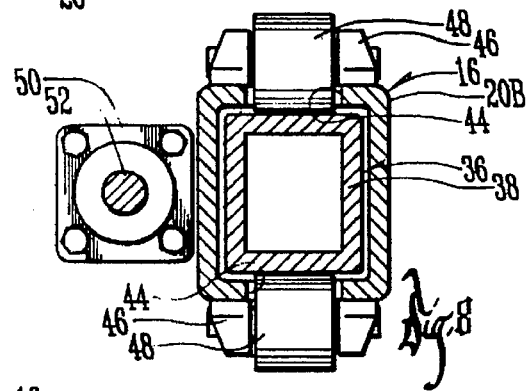
FIG. 8 is an enlarged scale sectional view take on line 8—8 of FIG. 7.

With reference to FIG. 8, a plurality of spaced openings 44 are located in the upper and lower portions of arms 20B. Roller bearings 46 are mounted over each of the openings 44 and rollers 48 of roller bearings 46 protrude through the openings to engage and slidably and rotatably support the arms 38 of loading frame 36.

Hydraulic cylinders 50 (FIG. 7 and 8) are secured in any convenient means to members 20B of loading cage 16. Each of the cylinders 50 has a conventional extendible piston rod 52 which is connected in conventional fashion to clevises 54 which are secured to horizontal arm 41 of loading frame 36. Operation of the hydraulic cylinders 50 permits the loading frame 36 to be moved either outwardly or inwardly with respect to the loading cage 16.

With reference to FIGS. 1 and 2, lower connector brackets 56 can be secured to vertical legs 18A or the cross members 57 which extend therebetween. A top connector bracket 58 is connected to the frame members 57. The conventional lower lifting arms 60 of tractor 61 are adapted to be connected to brackets 56 in conventional fashion. Similarly, top arm 62 of tractor 61 is conventionally connected to bracket 58.

With reference to the alternate form of the invention in FIGS. 9 and 10, a conventional tractor drawbar 64 of tractor 61 is connected to the forward end of tongue 66 which is pivotally secured to carrier frame 10 at 68. A conventional clevis 70 is mounted on the forward end of tongue 66 and receives drawbar pin 72 which in turn extends through a conventional aperture in tractor drawbar 64. The hydraulic cylinder 74 has one of its ends pivotally secured to tongue 66 at connector 76, with the upper end of the piston rod 77 of the cylinder 74 being connected to a clevis 78 secured in any convenient fashion to the carrier frame 10.

The numeral 80 designates a typical ground surface of a hay field. The numeral 82 (FIG. 1) designates the centrally elongated axis of carrier frame 10. The numeral 84 designates a bale to be loaded on the device of this invention and the numeral 86 (FIG. 5) designates the longitudinal axis of the round bale 84. The numerals 88 designate bales loaded before the bale 84.

Figure 6:
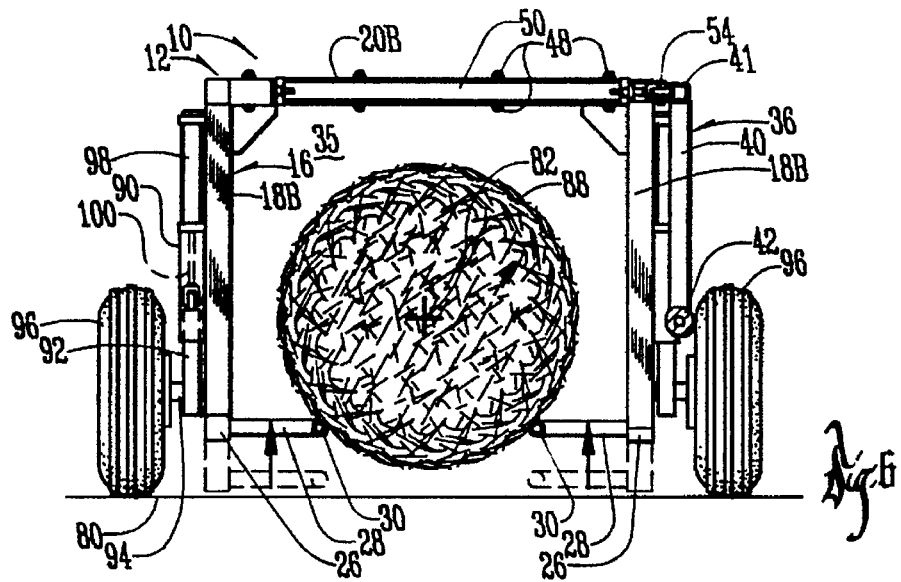
FIG. 6 is a view similar to that of FIG. 5 but shows the loaded bale lifted to the transport position.

With reference to FIG. 6, sleeves 90 are welded or otherwise secured to frame member 32. Bars 92 are slidably mounted in sleeves 92. Axle elements 94 are secured to and extend in a horizontal direction from the lower end of bars 92. Conventional wheels 96 are secured to axles 94. hydraulic cylinders 98 are secured to frame member 32 and have downwardly extending piston rods 100 which are secured to the upper ends of bars 92. The foregoing apparatus will permit the hydraulic cylinders 98 to raise or lower the carrier frame 10 with respect to the ground surface 80 as the piston rods 100 are extended or retracted, respectively, within cylinders 98.

In operation, the device of FIGS. 1 and 2 is pulled through the hay field which includes a plurality of bales 84. The loading frame 36 is extended in a lateral direction from the carrier frame 10 as shown in FIG. 3, and the cylinders 98, or alternatively, the cylinders 74, are actuated so that the carrier frame is in an elevated position with respect to the ground surface 80 as shown in FIG. 3.

Figure 3:
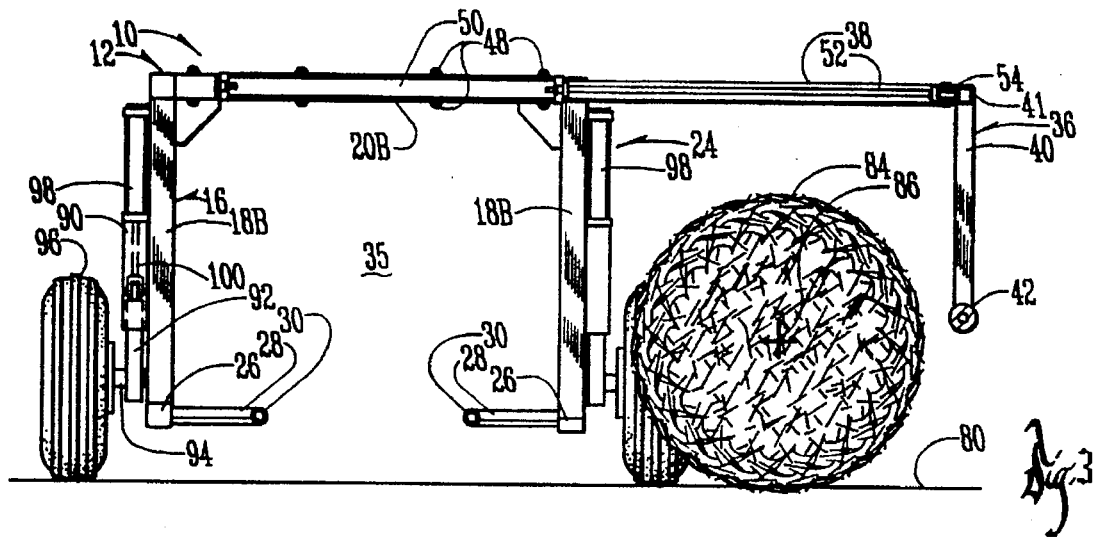
FIG. 3 is a sectional view taken on line 3—3 of FIG. 2, showing the initial position of the carrier frame with respect to a bale of hay to be loaded.

The carrier frame 10 is then pulled into a loading position with respect to bale 84 as shown in FIG. 3 whereupon the longitudinal axis 86 of the bale 84 is substantially parallel to the longitudinal axis 82 of the carrier frame.

Figure 4:
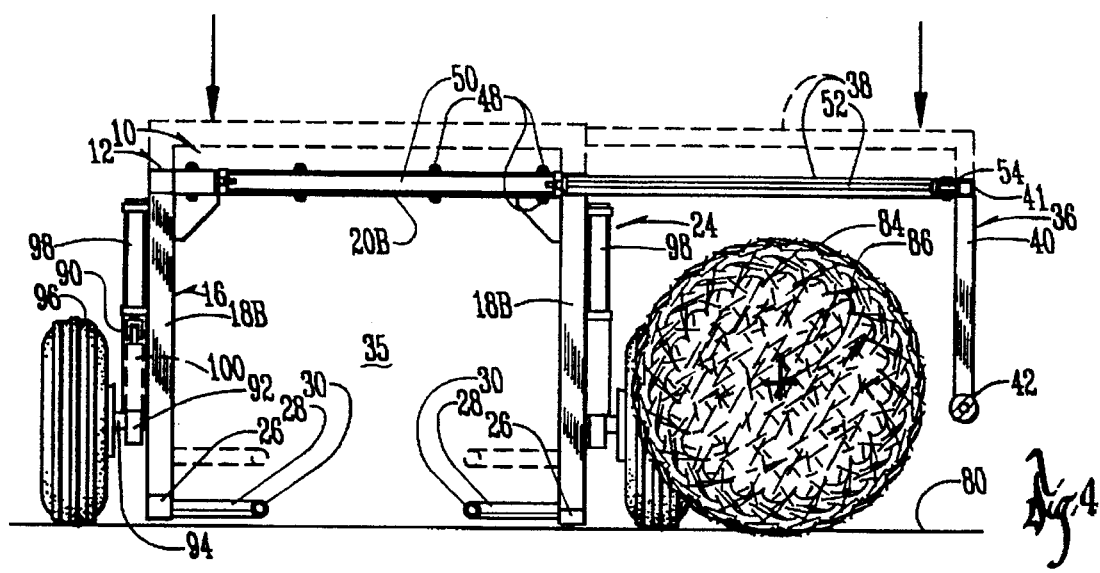
FIG. 4 is a view similar to that of FIG. 3 but shows the second stage of the bale loading process.
Figure 5:
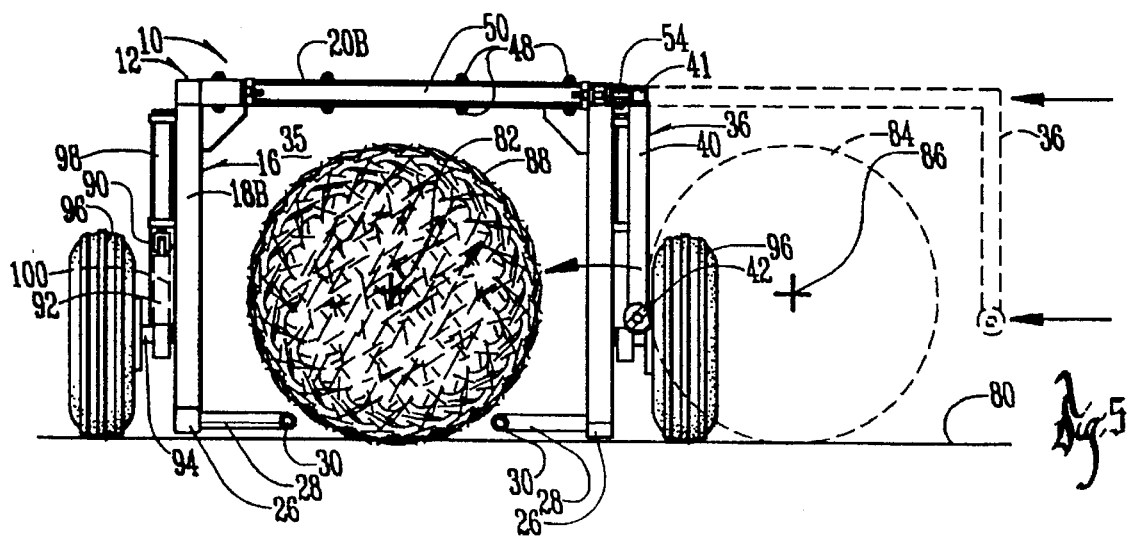
FIG. 5 is a view similar to that of FIG. 4 but shows the location of the bale within the carrier frame after the loading frame has moved the bale from the position of FIG. 4 to the position in FIG. 5.

If the device in FIGS. 1-8 is being used, the arms 60 and 62 of the conventional 3 point hitch of tractor 61 are lowered along with the cylinders 98 to lower the carrier frame to the ground surface 80 (FIG. 4). The cylinders 50 are then actuated to move the loading frame 36 inwardly towards the carrier frame 10. This causes the roller assembly 42 to engage the bale 84 and roll it laterally towards the loading cage 16 wherein the bale 84 moves through the side opening 24 into the loading cage. At the completion of this step, the bale 84 is positioned within the alley 35 of the carrier frame 10 as shown in FIG. 5. The carrier frame 10 is thereupon elevated either by lifting the arms 60 of the 3 point hitch of tractor 61, or by moving the cylinder 74 from the position shown in the dotted lines of FIG. 10 to the solid lines of FIG. 10. In either situation, the cylinders 98 on frame member 32 are also actuated to raise the rearward end of the carrier frame 10 in the manner previously described.

The foregoing discussion describes how a single bale 84 is retrieved from the hay field, rolled into the carrier frame 10, and moved to a transport position. Obviously, in accordance with the teachings of my co-pending application, the device of this invention is adapted to carry a plurality of bales. In such case, while the bale 84 is in the position of FIG. 5, the tractor 61 is actuated to move the carrier frame 10 forwardly a slight increment whereupon the bale 84 will move through the rear opening 22 of loading cage 16 to create an empty space within the loading cage 16. The carrier frame 10 is then elevated to the position shown in FIG. 6 whereby the bale 84 is lifted to an elevated position. As the process described above is repeated, and a new bale 84 enters the loading cage 16 in the manner described, the forward movement of the carrier frame 10 in the position of FIG. 5 will cause the most recently loaded bale 84 to push against any other bales in alley 35 to create the series of bales shown by the dotted lines in FIGS. 1 and 2.

As described in my co-pending application, the unloading of the bales shown by the dotted lines in FIGS. 1 and 2 is accomplished by moving the bales to the position shown by the bale 84 in FIG. 5, advancing the tractor so that the rearmost bale exits the alley 35 through the rearward end of the carrier frame 10. All or any number of the bales can be removed from the carrier frame 10 by this procedure.

It is therefore seen that this invention permits bales in a field of hay to be easily picked up, transported, and unloaded at the desired storage or feeding location with a minimum of effort.

The hydraulic connections to the various cylinders of this invention have not been shown in detail but would conventionally be connected to the hydraulic system of the tractor controlled by conventional hydraulic controls within the cab of the tractor.

It is therefore seen that this invention will achieve at least its stated objectives.

I claim:

1. A bale transport, comprising:

a carrier frame, a pair of elongated spaced beams on said frame, a pair of elongated rails secured to said beams and spaced inwardly therefrom in generally parallel relation thereto, wheels secured to said carrier frame, first power means connecting said frame and said wheels for raising and lowering said frame with respect to a supporting surface for said wheels, a loading frame on said carrier frame, second power means on said carrier frame, for rigidly extending said loading frame laterally with respect to said carrier frame, laterally slidable means on said loading frame for receiving and extending at least partially around a ground supported bale and engaging said bale for rolling lateral movement thereof on the ground surface onto said carrier frame when said loading frame is moved from an extended lateral position towards said carrier frame.

2. The device of claim 1 wherein said carrier frame has a forward end, means in said forward end for connecting said carrier frame to a prime mover.

3. The device of claim 1 wherein said carrier frame has forward and rearward ends, said loading frame being positioned on the forward end of said carrier frame, said carrier frame having sufficient length that a plurality of bales can be mounted on said rails by sequentially moving each loaded bale longitudinally rearwardly on said rails to create space on the forward end of said carrier frame for an additional bale to be loaded thereon by said loading frame.

4. The device of claim 1 wherein said carrier frame has forward and rearward ends, a loading cage on the forward end of said carrier frame, and said loading frame being mounted on said loading cage.

5. The device of claim 4 wherein said loading cage has a side opening to receive a bale by action of said loading frame, and a rear opening to permit a loaded bale to be slidably moved rearwardly with respect to said rails.

6. The device of claim 4 where in said loading cage is stationarily mounted on said carrier frame.

7. The device of claim 4 wherein said carrier frame has a pair of opposing sides and said loading frame is slidably mounted on said loading cage and is laterally extensible with respect to said loading cage and away from both of said sides of said carrier.

8. The device of claim 1 wherein said first power means and second power means each comprise at least one hydraulic cylinder.

9. The device of claim 1 wherein a roller is mounted between a pair of vertical arms on said loading frame to engage said bale as said bale is moved along a substantially linear path towards said carrier frame.

10. A bale transport, comprising:

a carrier frame, a pair of elongated spaced beams on said frame, a pair of elongated rails secured to said beams and spaced inwardly therefrom in generally parallel relation thereto, wheels secured to said carrier frame, first power means connecting said frame and said wheels for raising and lowering said frame with respect to a supporting surface for said wheels, a loading frame on said carrier frame, second power means on said carrier frame for rigidly and linearly extending said loading frame laterally and outwardly with respect to said carrier frame, laterally slidable means on said loading frame linearly extensible by said second power means for receiving and extending at least partially around a ground supported bale and engaging said bale for rolling lateral movement thereof on the ground surface transversely onto said carrier frame when said loading frame is moved from an extended lateral position towards said carrier frame.

* * * * *